United States Patent
Lee et al.

(10) Patent No.: US 9,230,086 B2
(45) Date of Patent: Jan. 5, 2016

(54) SYSTEM AND METHOD FOR DYNAMICALLY UNLOCKING MOBILE DEVICE

(71) Applicant: Samsung Electronics Co. Ltd., Suwon-si, Gyeonggi-do (KR)

(72) Inventors: Kyoungho Lee, Hwaseong-si (KR); Jongseob Kwak, Suwon-si (KR); Suksoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/649,288

(22) Filed: Oct. 11, 2012

(65) Prior Publication Data

US 2013/0094770 A1   Apr. 18, 2013

(30) Foreign Application Priority Data

Oct. 14, 2011   (KR) .......................... 10-2011-0105415

(51) Int. Cl.
*G06K 9/68* (2006.01)
*G06F 21/36* (2013.01)
*G06F 3/0488* (2013.01)

(52) U.S. Cl.
CPC .............. *G06F 21/36* (2013.01); *G06F 3/0488* (2013.01)

(58) Field of Classification Search
CPC . G06K 9/6202; G06K 9/6203; G06K 9/6206; G06F 17/30256; G06F 3/04883; H04W 8/245
USPC ................... 382/218, 209, 215, 103; 715/863; 455/418, 566
See application file for complete search history.

(56) References Cited

U.S. PATENT DOCUMENTS

| | | |
|---|---|---|
| 2009/0036100 A1 | 2/2009 | Lee |
| 2010/0075649 A1* | 3/2010 | Teng ............................ 455/418 |
| 2011/0246951 A1* | 10/2011 | Chen ............................ 715/863 |
| 2013/0138968 A1* | 5/2013 | Yudkin et al. ................. 713/183 |

FOREIGN PATENT DOCUMENTS

JP   2972979 B2   9/1999

* cited by examiner

*Primary Examiner* — Ruiping Li
(74) *Attorney, Agent, or Firm* — Jefferson IP Law, LLP

(57) ABSTRACT

A system and a method for dynamically unlocking a mobile device are provided. The method includes displaying various lock images, where at least one of the parts is altered, when an attempt is made to unlock the mobile device, determining whether a lock image, detected according to a user input, matches a preset image, and unlocking the mobile device according to the result of matching between the detected lock image and the preset image. The system and method increases the level of security when an unlock attempt is made in a public place.

16 Claims, 7 Drawing Sheets

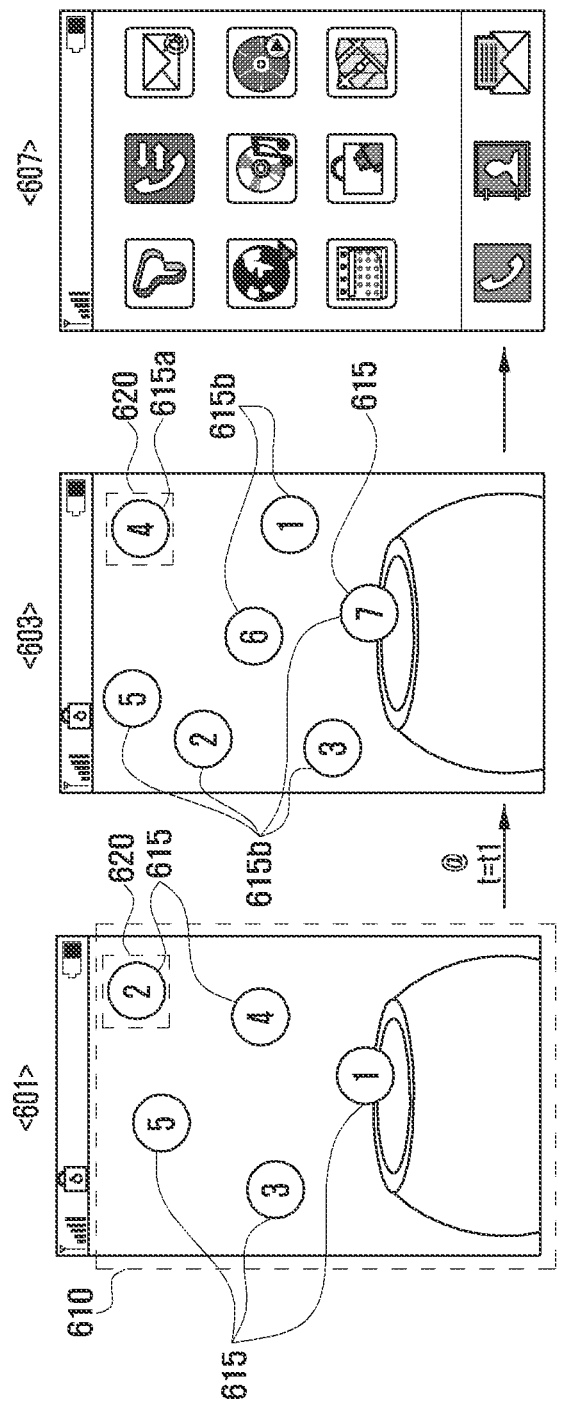

SYSTEM AND METHOD FOR DYNAMICALLY UNLOCKING MOBILE DEVICE

PRIORITY

This application claims the benefit under 35 U.S.C. §119(a) of a Korean patent application filed on Oct. 14, 2011 in the Korean Intellectual Property Office and assigned Serial No. 10-2011-0105415, the entire disclosure of which is hereby incorporated by reference.

BACKGROUND OF THE INVENTION

1. Field of the Invention

The present invention relates to unlocking a mobile device. More particularly, the present invention relates to a system and a method for minimizing exposure of a pattern used for dynamically unlocking a mobile device.

2. Description of the Related Art

Mobile devices refer to mobile communication systems supporting a call function and are widely used because they can be easily carried. Mobile devices allow users to record/input personal information or business-related information therein. In order to protect the information stored in mobile devices, they provide a lock function.

Mobile devices support various types of input modes with user convenience, e.g., touch screens each including a touch panel and a display unit. Mobile devices with touch screens support a lock function, cooperating with a touch function. For example, when a mobile device operating in a lock mode receives an unlock request, the touch screen displays a preset image to unlock the mobile device, such as a pattern, a text message, numbers, and the like. In that case, the user inputs his/her password to the touch screen, according to the contents of the image.

As such, mobile devices of the related art require users to input their preset passwords in order to be unlocked. However, inputting passwords to the mobile devices in environments, such as public places, means that the passwords may be easily exposed, which causes people, if they obtain mobile devices with passwords, to misuse them. Therefore, systems of the related art for unlocking mobile devices need to resolve the security of passwords in mobile devices.

Therefore, a need exists for a system and method for minimizing exposure of a pattern used for unlocking a mobile device, thereby providing a higher level of security to the mobile device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and a method for minimizing exposure of a pattern used for unlocking a mobile device, thereby providing a higher level of security to the mobile device.

In accordance with an aspect of the present invention, a method for dynamically unlocking a mobile device is provided. The method includes displaying various lock images, where at least one part is altered, when an attempt is made to unlock the mobile device, determining whether a lock image, detected according to a user input, matches a preset image, and unlocking the mobile device according to the result of the matching between the detected lock image and the preset image.

In accordance with another aspect of the present invention, a system for dynamically unlocking a mobile device is provided. The system includes a key input unit for creating a request signal for unlocking the mobile device, a touch screen for displaying a user interface and for receiving a user unlock attempt, and a controller for controlling the touch screen to display a lock image where at least one part is altered, and for unlocking the mobile device according to whether a lock image, detected according to a user input, matches a preset image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the invention will be more apparent from the following description taken in conjunction with the accompanying drawings, in which:

FIG. 6 illustrates screens to describe a dynamic unlocking method when a lock image varying mode is set to randomly vary locations of image elements in a lock image showing a specific theme according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1A:
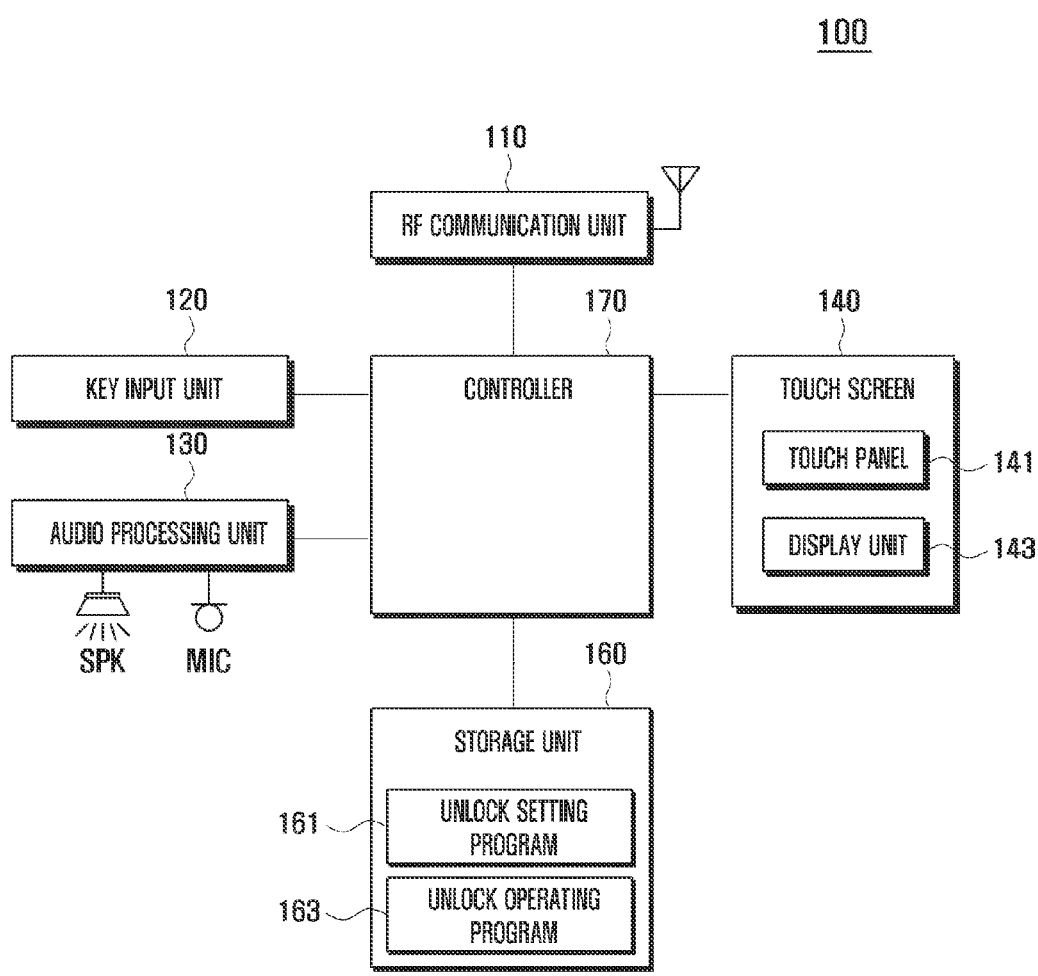
FIG. 1A illustrates a block diagram of a mobile device with a dynamic unlocking system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the following description, the term 'lock image' refers to a screen image that is displayed on a display unit when a locked mobile device receives an unlock request. The lock image for indicating a lock state includes symbols or text messages. The lock image may be varied partially or entirely. Varying part of the lock image means that only a specific area is varied in the lock image. For example, at least one of the color, shape, contents (e.g., pattern, letters, symbols, and the like), and size is varied in the area of the lock image. On the other hand, varying the entire lock image means that the lock image is replaced with another lock image.

FIGS. 1A through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1A illustrates a block diagram of a mobile device with a dynamic unlocking system according to an exemplary embodiment of the present invention. In the exemplary embodiment of the present invention, it is assumed that a mobile device 100 is one of a mobile phone, a smart phone, and a table Personal Computer (PC), equipped with a touch screen.

Referring to FIG. 1A, the mobile device 100 includes a Radio Frequency (RF) communication unit 110, a key input unit 120, an audio processing unit 130, a touch screen 140, a storage unit 160, and a controller 170.

The RF communication unit 110 establishes a communication channel, such as a voice/video call and a data communication channel, for transmitting data e.g., videos, text messages, and the like, with a base station, under the control of the controller 170. When the RF communication unit 110 receives an incoming call or data, it creates an unlock request signal and transfers it to the controller 170. When the controller 170 receives information via a communication channel, it supports a function to output various lock images. In that case, the key input unit 120 transfers its functions to the touch screen according to types of mobile devices, and only serves as side keys, hot keys, or a home key. The touch screen 140 creates user input signals, such as an unlock request signal, setting signals, an unlock signal, and the like.

The key input unit 120 includes input keys and function keys that allow the user to input numbers or letter information and to set a variety of functions. The function keys include direction keys, side keys, shortcut keys, and the like, which are set to perform specific functions. The key input unit 120 creates key signals for setting user options and for controlling functions of the mobile device 100 and transfers them to the controller 170. If the touch screen 140 is implemented with a full touch screen in the mobile device 100, the key input unit 120 may include side keys on the side of the case of the mobile device 100. If the mobile device 100 is locked, the key input unit 120 creates an unlock request signal and transfers it to the controller 170. The controller 170 supports a function to output various lock images that are requesting an unlock input, according to the received unlock request signal. Alternatively, the key input unit 120 creates a signal for setting an unlock mode and transfers it to the controller 170. The controller 170 supports a dynamic unlocking mode according to the received setting signal.

The audio processing unit 130 includes a speaker SPK for reproducing audio data transmitted during the call, included in received messages, created from the audio files stored in the storage unit 160. The audio processing unit 130 includes a microphone MIC for receiving a user's voice during the call or audio signals. When the mobile device 100 detects an unlock request signal or an unlock attempt signal, the audio processing unit 130 outputs the corresponding sound effects. If the unlock of the locked mobile device 100 succeeds or fails, the audio processing unit 130 outputs a corresponding sound effect. The mobile device 100 may be set in such a way that a sound effect may not be output, according to a user's settings.

The touch screen 140 includes a touch panel 141 and a display unit 143, where the touch panel 141 is installed to the front of the display unit 143. The size of touch screen 140 is determined by that of the touch panel 141.

The touch panel 141 is placed on the upper and/or lower side of the display unit 143. The touch panel 141 includes sensors arrayed in a matrix form. The touch panel 141 creates touch events according to the contact or the approach distance of an object, and transfers the corresponding signals to the controller 170. The touch panel 141 creates a touch event when an unlock attempt is performed. For example, unlock attempt touch events may occur on the touch panel 141.

The display unit 143 displays menus, user input information, and information provided to the user. The display unit 143 displays various types of screens, for example, a lock image, a main menu screen, a home screen, and the like. The display unit 143 may be implemented with a Liquid Crystal Display (LCD), an Organic Light Emitting Diode (OLED), or the like. The display unit 143 is placed on the upper or lower side of the touch panel 141. The display unit 143 displays various lock images according to setting modes, under the control of the controller 170.

The storage unit 160 stores at least one program needed to perform functions, user data, messages transmitted over the network, data generated when the programs are executed, and the like. The storage unit 160 includes a program storage area and a data storage area.

The program storage area stores an Operating System (OS) for booting the mobile device 100 and for controlling the components in the mobile device 100, applications downloaded from the network, and the like. The program storage area stores an unlock setting program 161 and an unlock operating program 163.

The unlock setting program 161 includes a number of routines for setting information that is input/output to unlock the mobile device 100. The routines are related to a lock image varying mode, a password element of a lock image, an unlock attempt input mode, an unlock administration condition, and the like.

The unlock operating program 163 includes a number of routines for unlocking the locked mobile device 100 when one of the various lock images, selected according to the user input, matches a preset image. The number of routines include a routine for outputting lock images (hereinafter called a lock image outputting routine), a routine for determining whether the mobile device 100 is unlocked (hereinafter called an 'unlock determination routine'), a routine for unlocking the mobile device 100 (hereinafter called an unlock routine), and the like.

The lock image outputting routine detects an unlock request signal and outputs various lock images according to a preset mode. During the output of the lock image, the lock image outputting routine may be set to alter image elements in the lock image, in terms of their shapes and locations, according to a common variation mode and a time interval.

The unlock determination routine determines whether the locked mobile device 100 is unlocked or maintains the lock state according to a user input unlock attempt, during the output of the various lock images. For example, the unlock determination routine determines whether to receive an unlock attempt input. When receiving an unlock attempt input, the unlock determination routine detects a currently displayed lock image and compares the detected lock image with a preset image. The unlock determination routine determines whether the detected lock image matches a preset image. The unlock determination routine unlocks the locked mobile device or maintains the unlocked state, referring to the match between the detected lock image and the preset image and referring to an unlock administration condition. The unlock administration condition will be described below.

The unlock routine unlocks the locked mobile device 100 according to the unlock administration. The unlock routine detects the state of the mobile device 100 when unlocking the mobile device 100, and displays the corresponding screen. For example, when unlocking the mobile device 100, the unlock routine may display a main menu screen, a home screen, an application execution screen, and the like.

The data storage area stores data created when the mobile device 100 is operated.

The data storage area stores unlock setting information that is used or created when the unlock setting program 161 is executed. The unlock setting information refers to information that defines a lock image varying mode, a password element of a lock image, an unlock attempt input mode, and the like. The unlock setting information sets an unlock administration condition.

The lock image varying mode refers to a mode where at least one of the shapes and locations of image elements forming a lock image is varied. An image element may be a shape of a specific object in a lock image. The password element, serving as one of the image elements in the lock image providing an opportunity to unlock to the locked mobile device, has a particular format complying with the lock image varying mode. For example, if the lock image varying mode is set to a color varying mode, the password element can be set as only one image element in yellow from among the other image elements. The number of password elements is at least one. The remaining image elements except for a password element in a lock image serve as counterfeit elements. The counterfeit elements comply with the lock image varying mode and are similar to the password element. However, the counterfeit elements differ from the password element in terms of format. For example, if the password element is yellow, the counterfeit elements are another color. If there are a number of counterfeit elements, they may each have different formats. As such, one lock image includes at least one password element and at least one counterfeit element, where the elements are displayed in the same varying mode. When an unlock attempt is made during the display of a lock image including at least one password element, the locked mobile device may be unlocked. The lock image is varied with a number of image elements therein when a user applies a gesture to the locked mobile device, thereby distracting other people from seeing the password. Therefore, other people cannot detect the user's unlock attempt applying to a lock image, thereby preventing the exposure of the user's password.

The unlock attempt input mode may be a specific type of touch event. Although the following exemplary embodiments of the present invention are described in such a way that the unlock attempt input is performed on the touch panel 141, it should be understood that the unlock attempt input may be applied to the key input unit 120.

The unlock administration condition defines the number of matching times and the number of mismatching times between a lock image detected when unlock attempts are made and a preset image.

The data storage area stores information that is used or created when the unlock operating program 163 is executed. For example, the data storage area stores displayed lock images by frames. When an unlock attempt is made and, thereby, an attempted unlock image is detected, the controller 170 can determines whether to unlock the locked mobile device, referring to the detected lock image frame.

The controller 170 controls the entire operation of the mobile device 100. The controller 170 controls the operations related to the dynamic unlocking functions. The controller 170 controls the display unit 143 to display a lock image varying in a preset mode. The controller 170 detects an unlock attempt input, compares the detected attempted unlock image with a preset image, and unlocks the locked mobile device if the detected attempted unlock image matches a preset image.

Figure 1B:
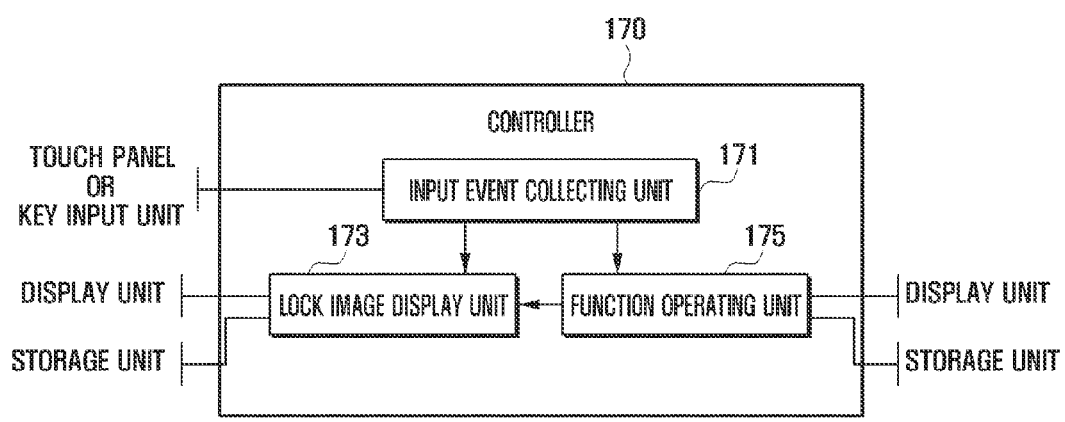
FIG. 1B illustrates a block diagram of a controller according to an exemplary embodiment of the present invention.

To this end, the controller 170 may include the following components as shown in FIG. 1B.

FIG. 1B illustrates a block diagram of a controller according to an exemplary embodiment of the present invention.

Referring to FIG. 1B, the controller 170 includes an input event collecting unit 171, a lock image display unit 173, and a function operating unit 175.

The input event collecting unit 171 receives inputs via the key input unit 120 or the touch panel 141, such as events for setting an unlock, events for operating an unlock, and the like. The unlock setting event relates to the settings of an unlock varying mode, a password element of a lock image, an unlock attempt input mode, an unlock administration condition, and the like. The unlock operating event may be an unlock request event and an unlock attempt event.

The input event collecting unit 171 receives an unlock request event via the key input unit 120 and outputs it to the lock image display unit 173. The input event collecting unit 171 receives an unlock attempt event via the touch panel 141. If the type of touch even matches a preset type of touch, the input event collecting unit 171 determines that the touch is an unlock attempt event, regardless of the locations on the touch screen where the touch is created. Alternatively, the input event collecting unit 171 may receive an unlock attempt event via the key input unit 120, according to the settings. In that case, the input event collecting unit 171 transfers the unlock attempt event to the function operating unit 175.

The lock image display unit 173 receives an unlock request event from the input event collecting unit 171, and controls the display unit 143 to display various lock images. The lock image display unit 173 accesses the storage unit 160, determines the lock image and the unlock information, and varies the lock image according to a preset mode.

The function operating unit 175 receives the unlock attempt event from the input event collecting unit 171, and compares a lock image detected when an unlock attempt is made with a preset image. When the function operating unit 175 determines that the detected lock image matches a preset image, it performs an unlock operation. For example, the function operating unit 175 accesses the storage unit 160, determines whether the currently displayed lock image includes a preset password element, and performs an unlock operation according to the determination. Alternatively, the function operating unit 175 determines whether the detected lock image matches a preset image and performs an unlock operation, referring to the determination and an unlock administration condition. For example, the function operating unit 175 determines whether the number of matching times and the number of mismatching times between the detected lock image and a preset image, set according to the unlock administration condition, satisfy preset values. If the function operating unit 175 determines that the number of matching times and the number of mismatching times each satisfy a preset number of times, it performs an unlock operation.

Figure 2:
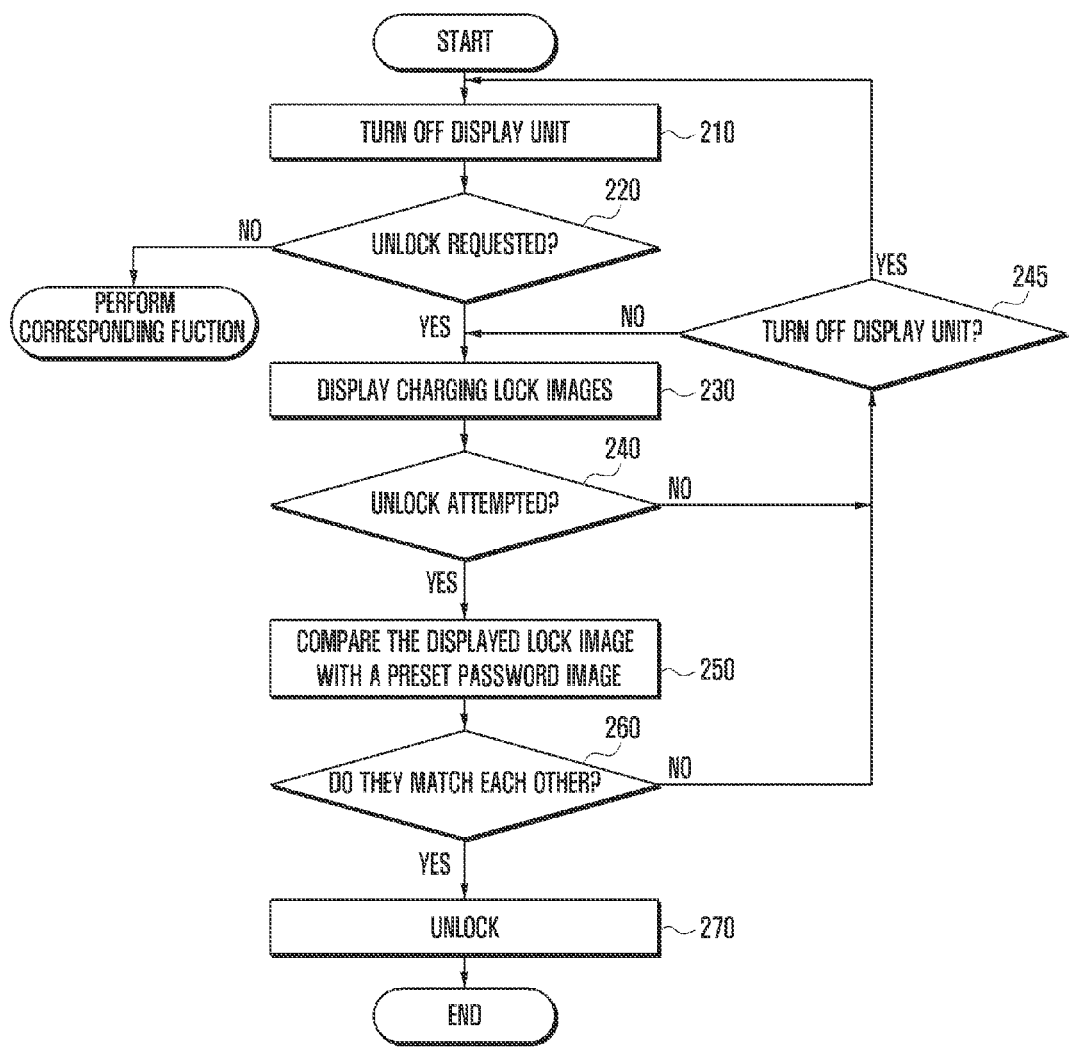
FIG. 2 is a flowchart illustrating a dynamic unlocking method according to an exemplary embodiment of the present invention.

FIG. 2 is a flowchart illustrating a dynamic unlocking method according to an exemplary embodiment of the present invention.

Referring to FIG. 2, when the mobile device 100 is operated in a lock state, the display unit 143 is turned off at step 210. Alternatively, when the mobile device 100 is operated in a lock state, the display unit 143 may be turned on.

The controller 170 determines whether an unlock request event occurs at step 220. If the controller 170 receives a signal corresponding to the unlock request event that the user creates via the key input unit 120, it determines that an unlock request event has occurred. Alternatively, if the controller 170 receives external data via the RF communication unit 110 from outside the locked mobile device 100, it determines that an unlock request has been made.

When the controller 170 determines that an unlock request event has occurred at step 220, it controls the display unit 143 to display various lock images at step 230. The display unit 143 displays a lock image that varies according to a preset mode. During the process, the controller 170 controls the supply of electric power to the display unit 143.

The lock image includes a number of image elements. An image element is a specific shape of an object in the lock image. The controller 170 varies a number of image elements according to a common variation mode. For example, the image elements are varied where at least one of their shapes and locations is varied. If a setting is made so that the elements vary in shape, the controller 170 supports the output of a number of image elements that vary at least one of factors, color, shape, contents (e.g., patterns, letters, symbols, and the like), and size. For example, if a setting is selected so that the image elements vary in color according to a common variation mode, the controller 170 varies the image elements in color as time elapses. In that case, it is preferable that the other factors, shape, contents, and size, of the image elements are not varied. Alternatively, when displaying a lock image, the controller 170 may control the display unit 143 to display the image elements that vary in color and size simultaneously. If a common variation mode is set so that a number of image elements are moved as time elapses, the controller 170 can move the image elements in certain directions. Alternatively, the controller 170 can move the image elements within a certain distance or in a certain direction. Alternatively, the controller 170 can vary the image elements in terms of a number of factors, shape and location, or a combination thereof.

The controller 170 controls the display unit 143 to display various lock images that include at least one password element and at least one counterfeit element. When displaying a password element, the controller 170 provides an opportunity to unlock the locked mobile device to the user. For example, the controller 170 controls the display unit 143 to periodically display a password element. The password element has a particular format, i.e., one unique shape or location, and varies this in a mode where the counterfeit elements are varied. For example, if a common variation mode is a color variation mode, a password element may be set as one of the image elements, where only it is yellow, for example, in the lock image. In that case, the counterfeit elements may be other colors except yellow. Counterfeit elements serve to prevent other people from focusing on a particular image element in the lock image when the user makes a gesture to input a password on the touch screen. Since counterfeit elements differ from a password element and vary in the same mode as the password element, other people cannot detect the password element.

After displaying the various lock images at step 230, the controller 170 determines whether an unlock attempt is made, via a touch event that occurs on the touch screen 140 at step 240. When the type of touch event is a preset type, the controller 170 determines that an unlock attempt has been made. The unlock attempt can be performed in any location on the touch screen 140. Therefore, the mobile device user can fake as he/she needs to select a particular image element to make an unlock attempt. Alternatively, the controller 170 can determine whether an unlock attempt is made via a signal from the key input unit 120.

When the controller 170 determines that an unlock attempt has not been made at step 240, it determines whether to turn off the display unit 143 at step 245. When the controller 170 determines that the user inputs a command for turning off the display unit 143 before a preset period of time at step 245, it proceeds with step 210 where it turns off the display unit 143. On the contrary, when the controller 170 determines that the user has not input a command for turning off the display unit 143 until a preset period of time has elapsed at step 245, it proceeds with step 230 where it controls the display unit 143 to display the various lock images.

On the contrary, when the controller 170 determines that an unlock attempt has been made at step 240, it compares a lock image detected when an unlock attempt is made with a preset image at step 250. The controller 170 sets a time point when the various lock images are detected according to the unlock attempt input. The controller 170 detects a lock image, displayed at the time point of unlock attempt, and compares the detected image with a preset image. An example of a preset image may be at least one password element. Therefore, the controller 170 compares a preset password element with image elements in the detected lock image.

The controller 170 determines whether a lock image displayed when an unlock attempt matches a preset image at step 260. When the lock image, detected at the time point of unlock attempt, includes a password element, it determines that the detected lock image matches a preset image, i.e., a password element. For example, the controller 170 may determine whether the detected lock image matches a preset image, by detecting whether one of image elements forming the detected lock image, according to the settings of a password element, includes particular formats, such as a preset color, shape, content (e.g., pattern, letters, symbols, and the like), size, and the like, or whether it is arrayed at a preset location. Alternatively, the controller 170 may determine whether the detected lock image matches a preset image, by detecting whether one of image elements forming the detected lock image includes a preset format and is arrayed at a preset location.

When the controller 170 determines that the detected lock image does not match a preset image at step 260, it determines whether to turn off the display unit 143 at step 245. On the contrary, when the controller 170 determines that the detected lock image matches a preset image at step 260, it unlocks the locked mobile device 100 at step 270.

The foregoing exemplary embodiment of the present invention was described based on an unlock administration condition where the number of matching times is one and the number of mismatching times is zero. In another exemplary embodiment of the present invention, if the unlock administration condition is set where the total number of matching times and mismatching times is two or more, a number of unlock attempts may be performed to unlock the locked mobile device, which is described below.

When inputs of a number of unlock attempts are required, the controller 170 determines whether the detected lock image matches a preset image at step 260 and updates the number of matching times or mismatching times counted since it has received an unlock request signal. The controller 170 determines whether the counted number of matching times or mismatching times satisfies the unlock administration condition defining the number of matching times or mismatching times. When the controller 170 determines that the counted number of matching times or mismatching times satisfies the unlock administration condition, it unlocks the locked mobile device at step 270. On the contrary, when the controller 170 determines that the counted number of matching times or mismatching times does not satisfy the unlock administration condition, it returns to and proceeds with step 230 where it displays various lock images.

Although the exemplary embodiment of the present invention was described in such a way that the locked mobile device is unlocked if the number of matching times and the number of mismatching times both satisfy the unlock administration condition, it should be understood that exemplary embodiments of the invention are not limited thereto. For example, the exemplary dynamic unlocking method may unlock the locked mobile device if the number of matching times satisfies a preset value as an unlock administration condition, irrespective of the number of mismatching times.

In the following description, exemplary embodiments of a dynamic unlocking method are described with respect to FIGS. 3 through 6.

Figure 3:
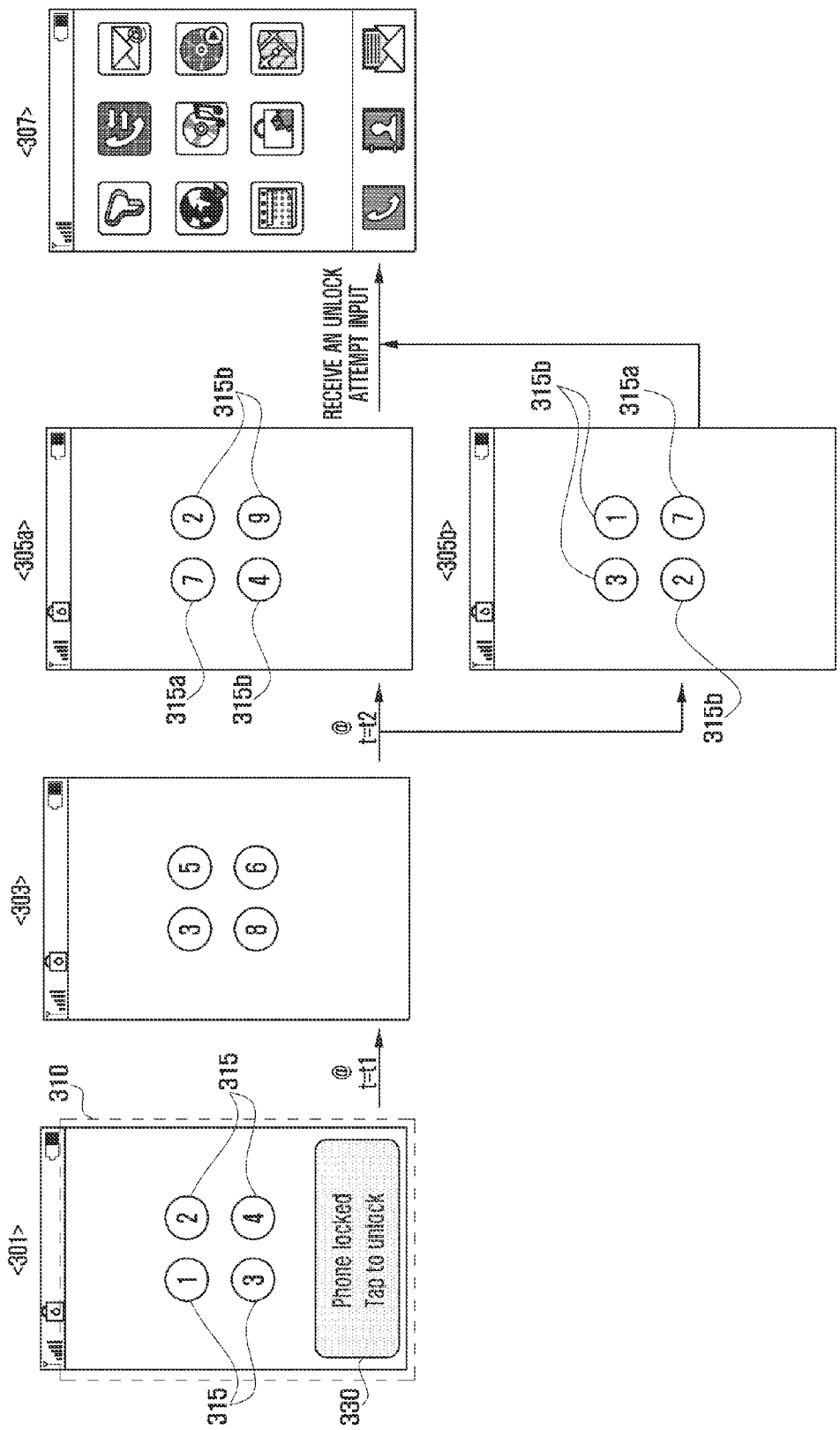
FIG. 3 illustrates screens to describe a dynamic unlocking method when a lock image varying mode is set to vary contents of image elements according to an exemplary embodiment of the present invention.

FIG. 3 illustrates screens to describe a dynamic unlocking method when a lock image varying mode is set to vary contents of image elements according to an exemplary embodiment of the present invention. In this exemplary embodiment of the present invention, it is assumed that the lock image includes image elements shaped as circles with numbers, a password element is a circle with number '7', and an unlock administration condition is defined in such a way that the number of matching times is one and the number of mismatching times is zero.

Referring to FIG. 3, as shown in diagrams 301, 303, and 305a/305b, the controller 170 supports the display of various lock images 310. When the mobile device 100, operated in a lock state where the display unit 143 is turned off, receives an unlock request signal, the controller 170 outputs the various lock images 310 as shown in diagram 301. The various lock images 310 include a number of image elements 315, i.e., circles with numbers. The various lock images 310 may further include a text message 330 informing the lock state and an input mode requested when an unlock attempt is made. The text message 330 may disappear on the various lock images 310 after a preset period of time has elapsed.

The controller 170 supports a control operation so that the image elements 315 are varied in a preset common varying mode. In an exemplary embodiment of the present invention, the image elements 315 vary, in terms of the contents therein, i.e., numbers. Therefore, as shown in diagram 303, the controller 170 controls the display unit 143 to vary numbers inside the circles 315, where numbers are randomly varied.

When the lock image 310 varies, the controller 170 supports a control operation so that a preset password element is periodically included in the lock image 310. For example, as shown in diagram 305a, the controller 170 controls the display unit 143 to vary the number in a circle 315a, located at the top left in the lock image 310, to a preset number '7.' The remaining circles 315b with numbers other than the password element with number '7' serve as counterfeit elements. The remaining circles 315b cannot include the same number as the password element. Alternatively, as shown in diagram 305b, the controller 170 may control the display unit 143 to vary the number in a circle 315a, located at the bottom right in the lock image 310, to a preset number '7.' As such, the controller 170 enables the image elements 315 to varying only their contents according to a common variation mode. However, it does not alter the other format factors, e.g., color, shape, size or location.

When an unlock attempt is made on a lock image 310 in which circles 315b with numbers and a circle 315a with a preset number '7' are displayed as shown in diagram 305a or 305b, the controller 170 detects the lock image 310 and determines whether the detected lock image 310 matches the circle 315a with number '7.' As shown in diagram 305a or 305b, since the lock image 310 include the circle 315a with number '7,' it concludes that the detected lock image 310 matches a preset image. In that case, the controller 170 unlocks the locked mobile device 100 and controls the display unit 143 to display a home screen as shown in diagram 307.

Meanwhile, an unlock administration condition can be set to the mobile device that requires a number of unlock attempts, thereby reinforcing the level of security.

For example, the unlock administration condition may be set in such a way that the number of matching times is two and the number of mismatching times is zero. In that case, the lock images 310 may be alternatively displayed as shown in diagrams 305a and 305b. The lock images 310, shown in diagrams 305a and 305b, include password elements 315a.

When the controller 170 detects unlock attempt inputs on the lock images 310 shown in diagrams 305a and 305b, it unlocks the locked mobile device.

Similarly, the unlock administration condition may be set in such a way that the number of matching times is one and the number of mismatching times is one. In that case, the lock images 310 may be alternatively displayed as shown in diagrams 303 and 305a. The lock image 310 shown in diagram 303 does not include a password element. On the contrary, the lock image 310 shown in diagram 305a includes a password element 315a. When the controller 170 detects unlock attempt inputs on the lock images 310 shown in diagrams 303 and 305a, it unlocks the locked mobile device.

Furthermore, the unlock administration condition may be set via a touch pattern by performing the number of matching times and the number of mismatching times. For example, the touch pattern can be set in such a way to perform a matching gesture once and mismatching gestures twice. In that case, the mobile device user touches once a lock image with a password element on the touch panel 141 and successively twice a lock image 310 without a password element, thereby unlocking the locked mobile device 100. Meanwhile, the touch pattern can be set by combining the performing number and order of the matching gesture and the mismatching gesture. For example, the touch pattern may be set in such a way that a mismatching gesture is first performed a preset number of times and a matching gesture is performed a preset number of times. In addition, the touch pattern may be set in such a way that a mismatching gesture is first performed a preset number of times, a matching gesture is performed a preset number of times, and the mismatching gesture is performed again a preset number of times. As such, since the unlock administration condition can be set to the mobile device in various types of modes, the mobile device user can prevent his/her unlock mode from being stolen by other people while unlocking the locked mobile device.

Figure 4:
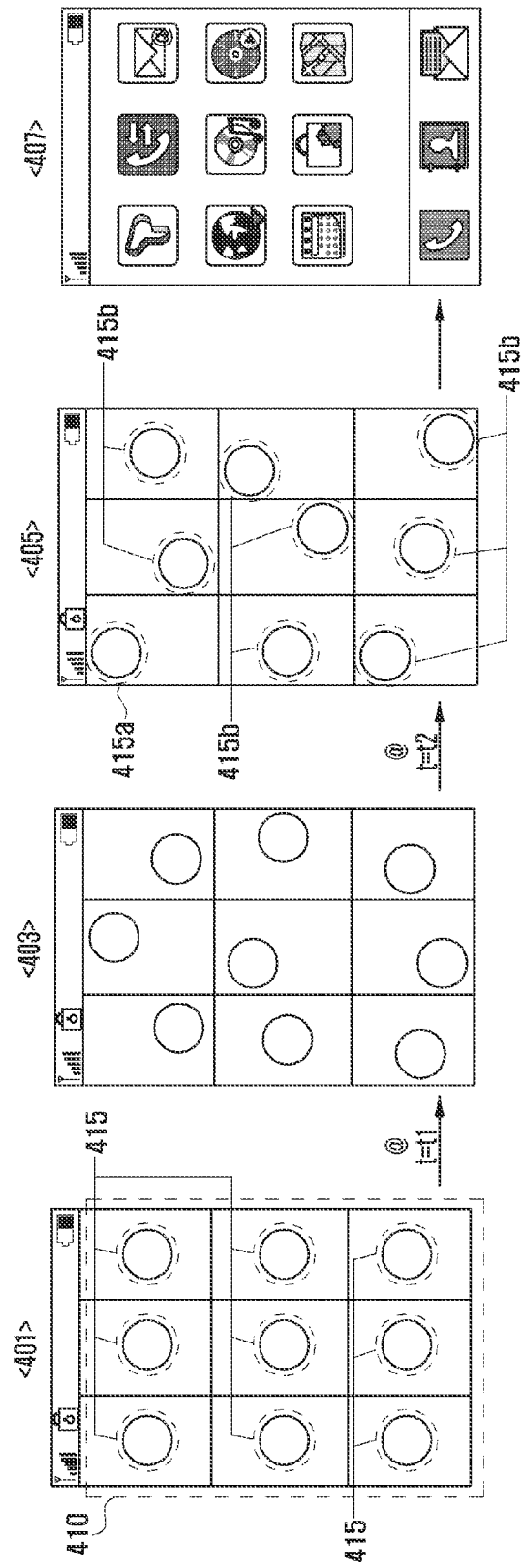
FIG. 4 illustrates screens to describe a dynamic unlocking method when a lock image varying mode is set to vary locations of image elements within a certain range according to an exemplary embodiment of the present invention.

FIG. 4 illustrates screens to describe a dynamic unlocking method when a lock image varying mode is set to vary locations of image elements within a certain range according to an exemplary embodiment of the present invention. In this exemplary embodiment of the present invention, it is assumed that a lock image 410 includes image elements 415 that are shaped as circles arrayed in a 3×3 grid, a password element is a circle at the top left cell in the 3×3 grid, and an unlock administration condition is set to determine whether to unlock the locked mobile device by performing an unlock attempt once.

Referring to FIG. 4, as shown in diagrams 401, 403, and 405, the controller 170 supports the display of various lock images 410. The controller 170 outputs the lock images 410 showing circles that are arrayed in the cells of a 3×3 grid, as shown in diagram 401. The image elements of the lock image 410 are circles 415.

After a certain period of time has elapsed, the controller 170 controls the display unit 143 to alter the circles 415 in terms of location in the respective cells on the screen as shown in diagram 403, compared with the screen as shown in diagram 401. The circles 415 are randomly moved, altering the locations. The controller 170 controls the display unit 143 to periodically move the circles 415a closely to the upper boundary of the top left cell in the 3×3 grid, as shown in diagram 405. The circle 415a serves as a password element, and the others 415b serve as counterfeit elements. Therefore, the controller 170 alters only the locations of the image elements 415 in a common variation mode, but does not alter their shapes.

When an unlock attempt is made on the lock image 410 with the password element 415a as shown in diagram 405, the controller 170 unlocks the locked mobile device 100, and controls the display unit 143 to display a home screen as shown in diagram 407. While the mobile device user is gazing at the top left cell of the lock image 410 on the display unit 143, when the circle moves to the upper boundary in the cell, he/she can make an unlock attempt thereto in order to unlock the locked mobile device.

Figure 5:
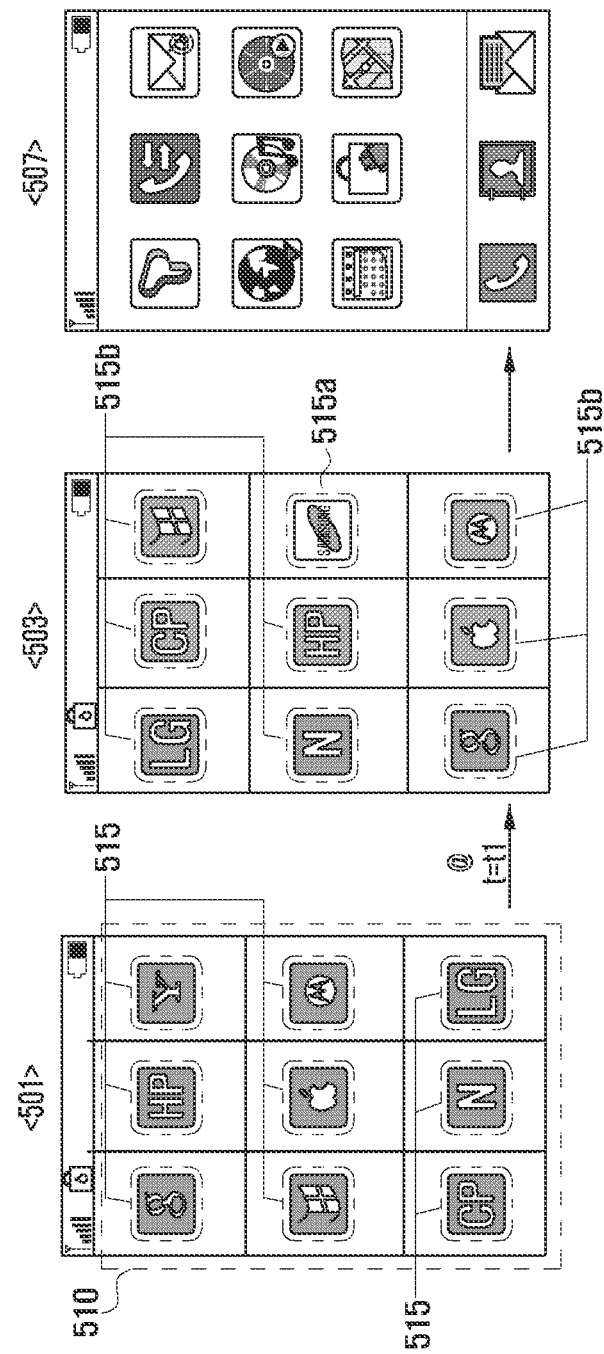
FIG. 5 illustrates screens to describe a dynamic unlocking method when a lock image varying mode is set to vary locations of a number of logo icons in a lock image according to an exemplary embodiment of the present invention.

FIG. 5 illustrates screens to describe a dynamic unlocking method when a lock image varying mode is set to vary locations of a number of logo icons in a lock image according to an exemplary embodiment of the present invention. In this exemplary embodiment of the present invention, it is assumed that a password element is set to a logo icon, i.e., SAMSUNG INC., and an unlock administration condition is set to determine whether to unlock the locked mobile device by performing an unlock attempt once.

Referring to FIG. 5, as shown in diagrams 501 and 503, the controller 170 supports the display of a lock image 510 with logo icons 515 that are arrayed and varied in respective cells. The logo icons 515 may be varied at random. As shown in diagram 503, the controller 170 controls the display unit 143 to alter a logo icon at the middle right in the lock image 510 to a preset logo icon 515a, i.e., SAMSUNG INC. The preset logo icon 515a serves as a password element, and the other logo icons 515b serve as counterfeit logo icons. When an unlock attempt is made on the screen as shown in diagram 503, the controller 170 unlocks the locked mobile device as shown in diagram 507.

FIG. 6 illustrates screens to describe a dynamic unlocking method when a lock image varying mode is set to randomly vary locations of image elements in a lock image showing a specific theme according to an exemplary embodiment of the present invention. In this exemplary embodiment of the present invention, it is assumed that a lock image 610 shows a lottery drawing as a theme, and image elements are lottery balls with numbers. It is also assumed that a password element is set to a ball with number 4 arrayed at the top right in the lock image 610 and an unlock administration condition is set to determine whether to unlock the locked mobile device by performing an unlock attempt once.

Referring to FIG. 6, as shown in diagrams 601 and 603, the controller 170 supports the display of a lock image 610 as if lottery balls are randomly discharged from the lottery wheel. The controller 170 controls the display unit 143 to vary the locations of the lottery balls 615 as shown in diagram 601. During this process, a ball with number 2 may be arrayed at the top right 620. When an unlock attempt is made on a lock image 610 as shown in diagram 601, the controller 170 rejects the unlock attempt and maintains the lock state. On the contrary, the controller 170 controls the display unit 143 to periodically display the lock image 610 so that a ball 615a with number 4, as a password element, is arrayed at the top right 620 as shown in diagram 603. When an unlock attempt is made on the lock image 610 with the password element 615a on the screen as shown in diagram 603, the controller 170 unlocks the locked mobile device 100, and controls the display unit 143 to display a home screen as shown in diagram 607. The balls with a number other than 4 serve as counterfeit balls 615b. While the mobile device user is gazing at the top right 620 of the lock image 610 on the display unit 143, when the ball with number 4, as a password element, appears thereat, he/she can make an unlock attempt thereto.

As described above, the system and method according to an exemplary embodiment of the present invention displays various lock images, and unlocks a locked mobile device according to a user input. Accordingly, although the mobile device user performs an unlock gesture in a public place, he/she can prevent the unlock mode from being stolen by other people.

The system and method according to an exemplary embodiment of the present invention varies a number of image elements in a lock image, so that a user can distract other people's attention from detecting the password while the user is making an unlock gesture, thus preventing the password from being stolen by other people.

The system and method according to an exemplary embodiment of the present invention can unlock the locked mobile device after performing a certain number of unlock attempts, thereby adaptively adjusting the level of security for an unlock function.

As described above, the system and method according to an exemplary embodiment of the present invention dynamically displays lock images that vary on the display unit of a mobile device, so that the user can unlock the mobile device with inputs and with a higher level of security. Therefore, although other people may observe a user making a gesture to unlock the mobile device employing the system and method in a public place, they cannot detect the mobile device user's unlocking method.

The system and method according to an exemplary embodiment of the present invention can alter a number of image elements in a lock image, and thus distract other people from observing the mobile device when the user makes a gesture to unlock the device. Therefore, although other people have recognized an image used to unlock a mobile device, they have difficulty detecting the key used for unlocking the password of the mobile device, thereby increasing the level of security.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for unlocking a mobile device, the method comprising:
   successively displaying lock images, each lock image having at least one image element, wherein at least one of the at least one image element changes with each successively displayed lock image;
   detecting a first user input for unlocking the mobile device during the successive displaying of the lock images;
   determining whether the first user input is detected at a time when the at least one image element of the displayed lock image includes a preset image element; and
   unlocking the mobile device if it is determined that the first user input is detected at the time when the at least one image element of the displayed image includes the preset image element,
   wherein the successively displaying of the lock images comprises displaying at least one lock image that does not include the preset image element.

2. The method of claim 1, wherein the at least one image element includes a plurality of image elements, and wherein the image elements vary in a common variation mode.

3. The method of claim 2, wherein each of the image elements vary in at least one of a particular format of the image element and a location of the image element.

4. The method of claim 2, wherein the preset image element comprises one of a specific image element and a specific image element disposed at a fixed location, whereby the remaining image elements are similar to the specific image element.

5. The method of claim 1, wherein the detecting of the first user input comprises determining if the first user input is applied to the preset image element.

6. The method of claim 5, further comprising determining if the first user input is applied to the preset image element when the preset image element is disposed at a specific location of the lock image.

7. The method of claim 1,
   further comprising determining whether a second user input is detected at a time when the at least one image element of the displayed lock image mismatches the preset image element,
   wherein the mobile terminal is unlocked when it is determined that the first user input is detected at the time when the at least one image element of the displayed image includes the preset image element and it is determined that the second user input is detected at the time when the at least one image element of the displayed image mismatches the preset image element.

8. The method of claim 1, wherein the successively displayed lock images include at least two counterfeit image elements that mismatch the preset image element.

9. A system for unlocking a mobile device, the system comprising:
   a key input unit for creating a request signal for unlocking the mobile device;
   a touch screen for displaying a user interface and for receiving a user unlock attempt; and
   a controller for controlling the touch screen to successively display lock images, each lock image having at least one image element, wherein at least one of the at least one image element changes with each successively displayed lock image, for detecting a first user input for unlocking the mobile device during the successive displaying of the lock images, for determining whether the first user input is detected at a time when the at least one image element of the displayed lock image includes a preset image element, and for unlocking the mobile device if it is determined that the first user input is detected at the time when the at least one image element of the displayed image includes the preset image element,
   wherein the controlling of the touch screen to successively display lock images comprises controlling the touch screen to display at least one lock image that does not include the preset image element.

10. The system of claim 9, wherein the at least one image element includes a plurality of image elements, and wherein the controller varies the image elements in a common variation mode.

11. The system of claim 10, wherein each of the image elements vary in at least one of a particular format of the image element and a location of the image element.

12. The system of claim 9, wherein the preset image element comprises one of a specific image element and a specific image element disposed at a fixed location, whereby the remaining image elements are similar to the specific image element.

13. The system of claim 9, wherein the controller detects the first user input by determining if the first user input is applied to the preset image element.

14. The system of claim 13, wherein the controller determines whether the first user input is applied to the preset image element when the preset image element is disposed at a specific location of the lock image.

15. The system of claim 9, wherein the successively displayed lock images include at least two counterfeit image elements that mismatch the preset image element.

16. The system of claim 9, wherein the controller determines whether a second user input is detected at a time when the at least one image element of the displayed lock image mismatches the preset image element, and
   wherein the mobile terminal is unlocked when it is determined that the first user input is detected at the time when the at least one image element of the displayed image includes the preset image element and it is determined that the second user input is detected at the time when the at least one image element of the displayed image mismatches the preset image element.

* * * * *